(12) United States Patent
He et al.

(10) Patent No.: US 8,069,658 B2
(45) Date of Patent: Dec. 6, 2011

(54) METHODS FOR ESTIMATING PARTICULATE LOAD IN A PARTICULATE FILTER, AND RELATED SYSTEMS

(75) Inventors: Suhao He, Painted Post, NY (US); Achim Karl-Erich Heibel, Corning, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 452 days.

(21) Appl. No.: 12/324,090

(22) Filed: Nov. 26, 2008

(65) Prior Publication Data

US 2010/0126145 A1    May 27, 2010

(51) Int. Cl.
*F01N 3/00* (2006.01)
(52) U.S. Cl. ............................................ 60/295; 60/286
(58) Field of Classification Search .................... 60/295; 55/282.3, 428.1, DIG. 10; 95/283
See application file for complete search history.

(56) References Cited

U.S. PATENT DOCUMENTS

| | | | |
|---|---|---|---|
| 5,110,747 A | 5/1992 | Pataschnick et al. | |
| 6,397,587 B1 | 6/2002 | van Nieuwstadt et al. | |
| 6,408,686 B1 | 6/2002 | Tallio et al. | |
| 6,758,039 B2 * | 7/2004 | Kuboshima et al. | 60/311 |
| 6,829,890 B2 * | 12/2004 | Gui et al. | 60/295 |
| 6,941,750 B2 | 9/2005 | Boretto et al. | |
| 6,947,831 B2 | 9/2005 | van Nieuwstadt | |
| 7,017,338 B2 | 3/2006 | van Nieuwstadt | |
| 7,031,827 B2 | 4/2006 | Trudell et al. | |
| 7,065,960 B2 | 6/2006 | Gioannini et al. | |
| 7,243,489 B2 | 7/2007 | Johnson et al. | |
| 7,263,825 B1 | 9/2007 | Wills et al. | |
| 7,322,184 B2 | 1/2008 | Kondou et al. | |
| 2006/0032217 A1 * | 2/2006 | Kondou et al. | 60/297 |
| 2007/0056270 A1 * | 3/2007 | Liimatta et al. | 60/295 |
| 2007/0056271 A1 * | 3/2007 | Berryhill et al. | 60/297 |
| 2007/0056272 A1 * | 3/2007 | Dollmeyer et al. | 60/297 |
| 2007/0056274 A1 * | 3/2007 | Wills | 60/297 |
| 2007/0061064 A1 * | 3/2007 | Dollmeyer et al. | 701/114 |
| 2007/0068147 A1 | 3/2007 | Sun et al. | |
| 2008/0028752 A1 * | 2/2008 | Lee | 60/295 |
| 2008/0078236 A1 | 4/2008 | Mital et al. | |
| 2008/0282682 A1 * | 11/2008 | Rhodes et al. | 60/291 |

FOREIGN PATENT DOCUMENTS

EP         1475523 A1 *  11/2004
WO    WO 2007/035577 A2    3/2007

OTHER PUBLICATIONS

Tandon, P. and D.E. Rosner, "Translational Brownian Diffusion Coefficient of Large (Multi-Particle) Suspended Aggregates," *I/EC Res.*, 34 (10), 3265-3277, 1995.

* cited by examiner

*Primary Examiner* — Thomas Denion
*Assistant Examiner* — Jason Shanske
(74) *Attorney, Agent, or Firm* — Matthew B. McNutt

(57) ABSTRACT

A method for regenerating a particulate filter may comprise calculating a first estimated soot load of a particulate filter based on a pressure drop of an exhaust gas flowing through the particulate filter, and calculating a second estimated soot load of the particulate filter based on a mass balance of soot in the particulate filter. The method may further comprise calculating a hybrid estimated soot load based on the first estimated soot load and the second estimated soot load, wherein calculating the hybrid estimated soot load comprises applying at least one gate so as to weight a relative contribution of each of the first estimated soot load and the second estimated soot load to the hybrid estimated soot load, and causing regeneration of the particulate filter when the hybrid estimated soot load is greater than or equal to a threshold value.

22 Claims, 9 Drawing Sheets

METHODS FOR ESTIMATING PARTICULATE LOAD IN A PARTICULATE FILTER, AND RELATED SYSTEMS

TECHNICAL FIELD

The present teachings relate generally to systems and methods for estimating particulate load in a particulate filter. More specifically, the present teachings relate to hybrid pressure drop and mass balance based systems and methods that estimate soot load in a particulate filter used with an internal combustion engine.

BACKGROUND

Environmental concerns have motivated the implementation of emission requirements for internal combustion engines and other combustion systems throughout much of the world. Catalytic converters have been used to eliminate many of the pollutants present in exhaust gas; however, a filter is often required to remove particulate matter, such as, for example, ash and soot. Wall-flow particulate filters, for example, are often used in engine systems to remove particulates from the exhaust gas. Such particulate filters may be made of a honeycomb-like substrate with parallel flow channels or cells separated by internal porous walls. Inlet and outlet ends of the flow channels may be selectively plugged, such as, for example, in a checkerboard pattern, so that exhaust gas, once inside the substrate, is forced to pass through the internal porous walls, whereby the porous walls retain a portion of the particulates in the exhaust gas.

In this manner, wall-flow particulate filters have been found to be effective in removing particulates from exhaust gas. However, the pressure drop across the wall-flow particulate filter increases as the amount of particulates trapped in the porous walls increases. The increasing pressure drop results in a gradual rise in back pressure against the engine, and a corresponding decrease in the performance of the engine. Accordingly, soot is commonly oxidized and removed in a controlled regeneration process before excessive levels have accumulated.

The ability to measure or estimate the amount of particulate, such as, for example, soot accumulated in a particulate filter is valuable as it helps to determine the regeneration schedule for the filter. Optimizing a filter's regeneration frequency, for example, can reduce the negative impacts of regeneration (e.g. increased emissions and fuel consumption) from too frequent regeneration, and protect the filter from over-exposure and possible failure due to the heightened energy release caused by excessive particulate loading from too infrequent regeneration. Accurately estimating the particulate load level (e.g., soot load level) in a particulate filter may thus facilitate determining when to initiate a timely and controlled regeneration event.

Conventional methodologies for estimating soot load in a particulate filter include both pressure drop based techniques and mass balance based techniques. Pressure drop based systems and methods have been shown to accurately estimate soot load in a particulate filter even under very dynamic operating conditions. Under certain engine operating conditions, however, notably during long idle times, during active regeneration and during periods of filter ash conditioning, pressure drop based methods can also have some limitations, thereby providing somewhat less accurate soot load estimates during such periods.

On the other hand, although having somewhat limited accuracy under dynamic operating conditions and regions of fast transients, mass balance based techniques for estimating soot load can generally be relatively accurate during steady state conditions, including, for example, during long engine idle times and active regeneration. Furthermore, due to ash accumulation effects, mass balanced based estimation approaches are generally more reliable during periods of filter ash conditioning, for example, during the first few thousand miles of filter exposure to engine operation. Ash conditioning refers to a period of ash accumulation on a filter's wall surfaces. Prior to the formation of an ash layer, particulate matter is able to penetrate the filter wall, a filtration mode commonly referred to as deep-bed filtration. Once an ash layer is formed, however, particulate matter is unable to penetrate the filter wall and is primarily captured on the surface of the filter wall, a filtration mode commonly referred to as cake-bed filtration.

It may be desirable, therefore, to provide an approach for estimating soot load that provides relatively high levels of estimation accuracy throughout all periods of engine operation, for example, during both dynamic operating conditions and steady state conditions, long idle times and active regeneration, and during periods of filter ash conditioning. It also may be desirable to provide an approach for estimating particulate load that is relatively simple to implement, using the instrumentation and sensors already available as part of an engine's after-treatment system.

SUMMARY

In accordance with various exemplary embodiments, the present teachings provide a method for regenerating a particulate filter, comprising calculating a first estimated soot load of a particulate filter based on a pressure drop of an exhaust gas flowing through the particulate filter; calculating a second estimated soot load of the particulate filter based on a mass balance of soot in the particulate filter; calculating a hybrid (i.e., combined) estimated soot load based on the first estimated soot load and the second estimated soot load, wherein calculating the hybrid estimated soot load comprises applying at least one gate so as to weight a relative contribution of each of the first estimated soot load and the second estimated soot load to the hybrid estimated soot load; and causing regeneration of the particulate filter when the hybrid estimated soot load is greater than or equal to a threshold value.

In accordance with various additional exemplary embodiments, the present teachings provide a system for estimating soot load in a particulate filter, comprising a temperature sensor, a pressure drop sensor, and at least one engine sensor; and at least one controller configured to receive signals from the temperature sensor, the pressure drop sensor, and the at least one engine sensor, and dynamically calculate both a pressure drop based soot load estimate and a mass balance based soot load estimate based on the signals, wherein the controller is configured to apply at least one gate to weight a relative contribution of each of the pressure drop based soot load estimate and the mass balance based soot load estimate to determine a hybrid soot load estimate.

In accordance with various further exemplary embodiments, the present teachings provide a method for regenerating a particulate filter used for treating exhaust gas from a combustion engine, the method comprising calculating a pressure drop based soot load estimate and a mass balance based soot load estimate; weighting each of the pressure drop based soot load estimate and the mass balance based soot load estimate based on a period of engine operation, the weighting yielding a weighted pressure drop based soot load estimate and a weighted mass balance based soot load estimate; calculating a soot load estimate based on the weighted pressure drop based soot load estimate and the weighted mass balance based soot load estimate; and causing regeneration of the particulate filter when the hybrid estimated soot load is greater than or equal to a threshold value.

Additional objects and advantages will be set forth in part in the description which follows, and in part will be obvious from the description, or may be learned by practice of the present teachings. The objects and advantages may be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The present teachings can be understood from the following detailed description either alone or together with the accompanying drawings. The drawings are included to provide a further understanding of the present teachings, and are incorporated in and constitute a part of this specification. The drawings illustrate one or more embodiments of the present teachings and together with the description serve to explain the principles and operation.

DETAILED DESCRIPTION

Figure 1:
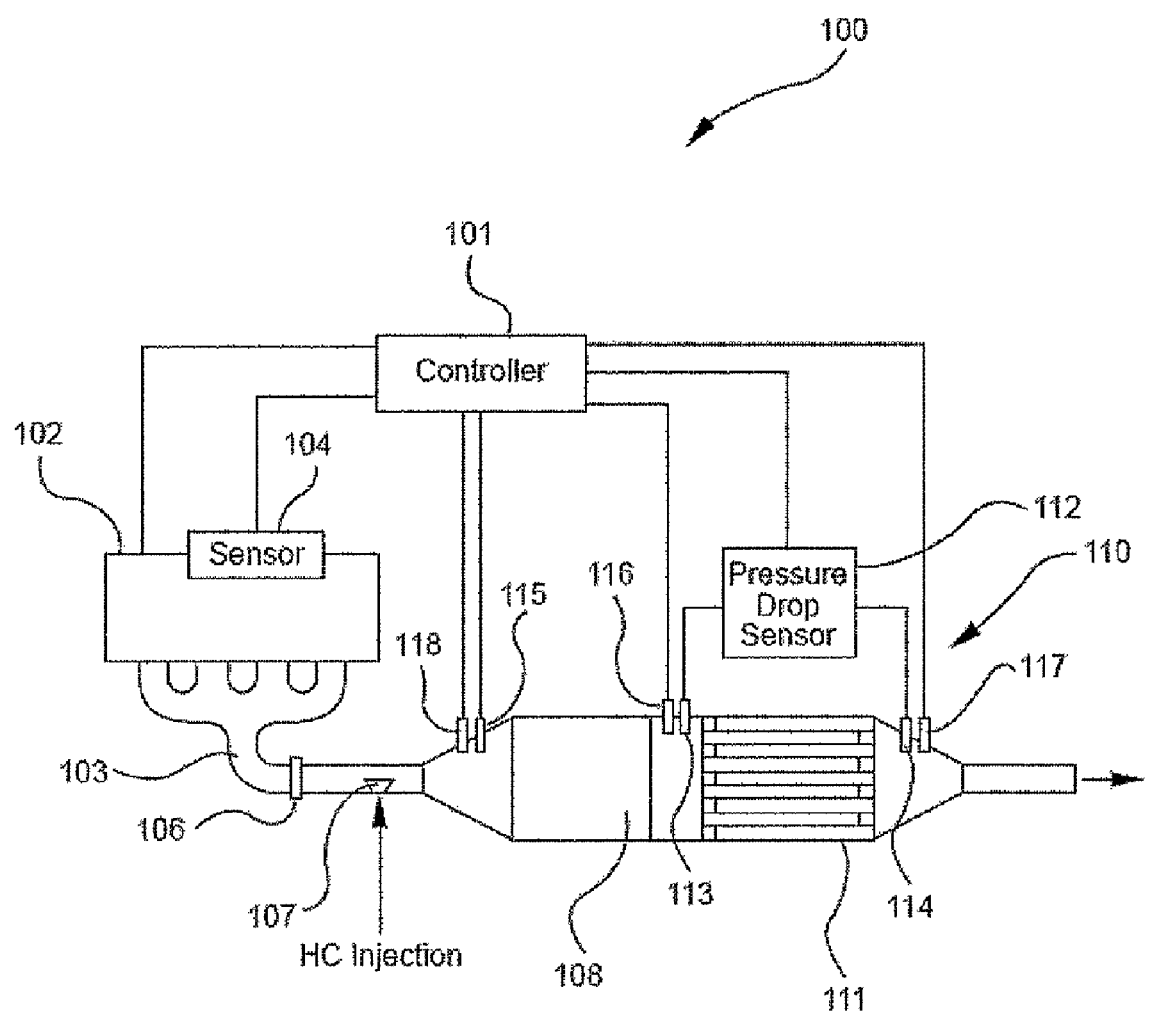
FIG. 1 is a schematic diagram of an exemplary embodiment of a system for estimating soot load in accordance with the present teachings.

The present teachings contemplate using a hybrid pressure drop and mass balance based approach that relies more or entirely on pressure drop based soot load estimation during periods of high estimate accuracy, but relies more or entirely on mass balance based soot load estimation during periods in which a pressure based approach has diminished accuracy.

The pressure drop behavior of a fluid (e.g., post-combustion gas) flowing through a particulate filter may be used to estimate the particulate load in the particulate filter. For example, as a particulate accumulates in the filter, the pressure drop across the filter (e.g., from an inlet end to an outlet end) increases due to the increased restriction of the fluid (e.g., gas) passing through the filter's permeable particulate (erg., including soot particulate and ash particulate) and porous wall layers. The particulate load in a particulate filter can be estimated even under dynamic operating conditions (e.g., under both steady state and unsteady state conditions, such as, acceleration and deceleration), utilizing pressure drop based estimation systems and methods, which consider, for example, this pressure drop (e.g., the total pressure change or total pressure drop of fluid flowing through the particulate filter), the flow rate of the fluid flowing through the particulate filter, and a temperature of the fluid flowing through the particulate filter, while also taking into account the effects of a particulate filter's microstructure, geometry and particulate loading levels on the filter's pressure drop behavior.

Although a pressure drop approach like that described above can provide relatively accurate particulate load estimates throughout much of an engine's operation, during certain periods, that accuracy may still be somewhat limited. Notably, the confidence level in pressure drop based particulate load estimates may drop during long periods of engine idling, during active regeneration of the particulate filter, when fluid (e.g., exhaust gas) temperatures are generally significantly higher then normal, and/or during ash conditioning of the filter (e.g., when the filter is green and becoming loaded with ash). Pressure drop approaches may thus employ various gates and filters to suppress unsteady input data (e.g., high temperatures) and fluctuations in particulate load estimates, produced, for example, during unreliable periods of estimation, as disclosed, for example, in U.S. application Ser. No. 12/324,001, entitled "Systems and Methods for Estimating Particulate Load in a Particulate Filter," filed Nov. 26, 2008, the entire contents of which are incorporated by reference herein.

The mass balance of the particulate matter (e.g., soot and ash) in a particulate filter may also be used to estimate the particulate load (e.g., soot load and ash load) in the particulate filter. For example, the current particulate load level in a filter represents the amount of particulate added to the filter by a fluid (erg., post-combustion gas), offset by the amount of particulate (e.g., soot) burnt off of the filter during regeneration. Mass balanced based approaches, however, can have limited accuracy during various more dynamic portions of an engine's operating cycle, but provide relatively accurate particulate load estimates during steady state operating conditions, such as, for example, during long engine idle times and active regeneration. Furthermore, due to ash accumulation effects, a new (e.g., green part) particulate filter generally goes through an initial period (e.g., the first few thousands of miles of driving) of ash conditioning before there is an adequate pressure drop response to soot load to produce accurate pressure based soot load estimates. Accordingly, during this initial conditioning period, pressure based estimation approaches are generally unreliable, and mass balanced based estimation approaches can be relied upon to determine whether or not to activate regeneration.

In order to accurately estimate the soot load in a particulate filter over the entire range of engine operation (e.g., during acceleration, deceleration, standard idling, extended idling, active regeneration, etc.) and throughout the entire life of a particulate filter (e.g., when a filter is green or conditioned), exemplary embodiments of the present teachings consider a hybrid (i.e., combined) pressure drop and mass balance based estimation approach that utilizes the pressure drop behavior of a particulate filter to estimate a soot load in the particulate filter during periods of more reliable accuracy, and utilizes the amount of soot mass change in the particulate filter to estimate the soot load during periods in which a pressure based approach may have diminished accuracy. Such periods of diminished accuracy may include, for example, periods during which quality gates are employed to suppress the pressure drop based approach.

Accordingly, to increase overall estimation accuracy, a pressure drop based estimation approach, such as, for example, the systems and methods for estimating particulate load in a particulate filter as disclosed in U.S. application Ser. No. 12/324,001, incorporated by reference herein, can be used in combination with a mass balance based soot load calculation.

Various exemplary embodiments mentioned above and described herein, therefore, include systems and methods that consider both a particulate filter's total pressure drop behavior and the mass balance of soot in the particulate filter, depending on the period of engine operation, to accurately estimate the soot load in the filter at any given time during an engine's operation, thereby permitting timely regeneration of the filter when the estimated soot load is greater than or equal to a threshold value. In accordance with various exemplary embodiments, a hybrid soot load estimate may be determined that reflects both a pressure drop based estimated value and a mass based estimated value and appropriately weights those estimations depending on the accuracy of the estimates, which may, for example, depend on the period of engine operation. In some cases, however, the weighting may be such that only the estimation from a pressure drop based approach is used or only the estimation from the mass balance based approach is used.

As used herein, the term "particulate filter" or "filter" refers to a structure which is capable of removing particulate matter, such as, for example, soot and ash, from a fluid stream, such as, for example, an exhaust gas stream, passing through the structure. The present teachings may apply to the removal of soot and ash and/or other particulate matter from any exhaust gas stream, such as, for example, exhaust gases produced by internal combustion engines, such as gasoline and diesel engines, and coal combustion flue gases produced in coal gasification processes. As used herein, the term "soot" refers to impure carbon particles that result from the incomplete combustion of hydrocarbons, such as, for example, during the internal combustion process. The term "ash" refers to non-combustible metallic material that is found in almost all petroleum products. For diesel applications, "ash" is typically produced from crankcase oil and/or fuel borne catalysts.

As used herein, the term "total pressure drop" refers to the pressure drop resulting from a combination of inlet/outlet contraction losses, inlet/outlet channel losses and permeable layer losses, including particulate (e.g., soot and ash) and wall permeability losses, represented by the relation:

$$\Delta p = \Delta p_{in/out} + \Delta p_{inlet\text{-}channel} + \Delta p_{outlet\text{-}channel} + \Delta p_{soot} + \Delta p_{ash} + \Delta p_{wall},$$

wherein $\Delta p$ is the total pressure drop, $\Delta p_{in/out}$ represents the inlet/outlet contraction losses, $\Delta p_{inlet\text{-}channel}$ represents the inlet channel losses, $\Delta p_{outlet\text{-}channel}$ represents the outlet channel losses, $\Delta p_{soot}$ represents the soot permeable layer losses, $\Delta p_{ash}$ represents the ash permeable layer losses and $\Delta p_{wall}$ represents the wall permeable layer losses.

As used herein, the term "mass balance of particulate" refers to the amount of particulate mass change in a particulate filter, and may be represented by the amount of particulate added from the gas stream flowing through the filter (particulate influx), minus particulate that is burnt by both passive regeneration due to the reaction with $NO_2$ and active regeneration due to the reaction with $O_2$ (particulate burnout by regeneration). A mass balance of soot is determined as described above, with the particulate being soot.

As used herein, the term "causing regeneration" refers to the initiation of filter regeneration, regardless of the type of regeneration. By way of example only, the present teachings contemplate using any known suitable regeneration methods and/or techniques, including, but not limited to, active and passive regeneration, and on-board and off-board (requiring operator intervention) regeneration. Exemplary regeneration techniques include, for example, heating inlet exhaust gases to a temperature at which it is favorable to burn soot off of a particulate filter and/or adding a catalyst to the filter to decrease the soot reaction light-off temperatures. Those ordinarily skilled in the art are familiar with various regeneration techniques for particulate filters and the present teachings contemplate any such regeneration techniques.

The filters of the present teachings can have any shape or geometry suitable for a particular application, as well as a variety of configurations and designs, including, but not limited to, a flow-through monolith structure, a wall-flow monolith structure, or any combination thereof (e.g., a partial-flow monolith structure). Exemplary flow-through monoliths include, for example, any monolithic structure comprising channels or porous networks or other passages that are open at both ends and permit the flow of exhaust gas through the monolith passages from one end to an opposite end. Exemplary wall-flow monoliths include, for example, any monolithic structure comprising channels or porous networks or other passages with individual passages open and plugged at opposite ends of the structure, thereby enhancing gas flow through the channel walls of the monolith as the exhaust gas flows from one end to the other. Exemplary partial-flow monoliths include, for example, any monolithic structure that is partially flow-through and partially wall-flow. Various exemplary embodiments of the present teachings, contemplate utilizing the cellular geometry of a honeycomb configuration due to its high surface area per unit volume for deposition of soot and ash. Those having ordinary skill in the art will understand that the cross-section of the cells of a honeycomb structure may have virtually any shape and may include, by way of example and without limitation, square, rectangular, hexagonal, triangular, circular, and oval cross-sections. Similarly, a honeycomb structure may be configured as either a flow-through structure, a wall-flow structure, or a partial-flow structure.

FIG. 1 is a schematic, block diagram of one exemplary embodiment of a system for estimating soot load in accordance with the present teachings. A soot load estimation system 100 is shown in operational relationship with an internal combustion engine 102. The engine 102 can be any type of internal combustion engine, including, but not limited to, for example, an auto-cycle engine, a two-stroke engine or a diesel engine, used in any type of machine or vehicle, stationary or moving, including a pump, generator, automobile, truck, boat, train, etc.

The engine 102 has an exhaust manifold 103 to direct exhaust gases from the engine 102 to an exhaust system 110. Exhaust system 110 is coupled to the exhaust manifold 103 via an exhaust flange 106 and may include a particulate filter 111 a pressure drop sensor 112, and temperature sensors 116 and 117. In an exemplary embodiment of a diesel engine, depicted for example, in FIG. 1, a doser 107 for hydrocarbon injection supplied by post- or in-cylinder injection, a temperature sensor 115 and a diesel oxidation catalyst (DOC) 108 may also be provided upstream of the particulate filter 111. Also in an exemplary embodiment, as depicted for example in FIG. 1, a flow rate sensor 118 may also be included. As will be described in further detail below, however, flow rate may also be calculated rather than or in addition to being sensed.

Although the particulate filter 111 is depicted as a cylindrical wall-flow monolith, those skilled in the art would understand that such shape and configuration is exemplary only and particulate filters in accordance with the present teachings may have any shape or geometry suitable for a particular application, as well as a variety of configurations and designs, including, but not limited to, a wall-flow monolith structure, a flow-through monolith structure, and a partial-flow monolith structure.

Those having skill in the art will further understand that the number and positioning of sensors 112, 115, 116, 117 and 118, and the various post-combustion gas treatment components, such as for example the doser 107 and DOC 108, depicted in FIG. 1, are schematic and exemplary only and that the exhaust system 110 may include a variety of sensor configurations and components without departing from the scope of the present teachings. Those having ordinary skill in the art would understand how to modify the sensors and/or components depicted in FIG. 1 based on desired treatment and control mechanisms without departing from the scope of the present teachings Various exemplary embodiments of the present teachings, for example, contemplate the pressure drop sensor 112 as a set of sensors 113 and 114 positioned upstream and downstream of the particulate filter 111, respectively. Various additional exemplary embodiments of the present teachings consider a single pressure drop sensor 112 configured to measure the differential pressure across the particulate filter 111. Various exemplary embodiments of the present teachings further contemplate, for example, a set of sensors 116 and 117 positioned upstream and downstream of the particulate filter 111, respectively, to determine, for example, an average temperature of the exhaust gas flowing through the particulate filter 111. Various additional exemplary embodiments of the present teachings also contemplate a single temperature sensor 116 configured to measure the input temperature of the particulate filter 111, for example, when only one sensor is available, whereas various further exemplary embodiments of the present teachings contemplate a single temperature sensor 117 configured to measure the output temperature of the particulate filter 111, for example, during regeneration conditions. Furthermore, various exemplary embodiments of the present teachings additionally consider the temperature sensor 116 configured to measure the DOC out/particulate filter in exhaust gas temperature using an energy balance on the DOC 108. Based on the present teachings, those having skill in the art would understand various other sensor types, positions, and configurations that may be used to implement the soot load estimation systems and methods in accordance with exemplary embodiments.

Various exemplary embodiments of the present teachings contemplate using existing sensors already available as part of the exhaust system 110. Various exemplary embodiments of the present teachings also contemplate systems which include additional sensors as needed to provide the signal inputs used in the systems and methods of the present teachings. Those skilled in the art would understand that the type, number and configuration of such sensors may be chosen as desired based on availability, expense, efficiency and other such factors.

Those skilled in the art also would understand that the exhaust system 110, as a whole, is exemplary only and not intended to be limiting of the present teachings and claims. For example, in FIG. 1, the DOC 108 may be positioned upstream of the particulate filter 111 to better facilitate heating of the exhaust gas through reactions with hydrocarbons (HC) provided, for example, by post or in-cylinder injection by doser 107. Depending upon the type of engine used and the particular application employed, the exhaust system 110 may include additional after-treatment components, such as, for example, additional catalysts, traps, mufflers, heaters, reductant injectors, and/or bypass valves in combination with the particulate filter 111.

A controller 101 is configured to receive signals from the pressure drop sensor 112, temperature sensors 115, 116, and 117, and the flow rate sensor 118. The controller 101 is configured to dynamically estimate a pressure drop based soot load, $SL_{PD}$, in the particulate filter 111 based on the signals received from one or more of the sensors 112, 115, 116, 117 and 118 as set forth in the following exemplary embodiments and as would be understood by those having ordinary skill in the art depending on which sensors are available in a system for which soot load estimation is desired. The controller 101 may include an existing controller such as an engine control unit (ECU), a dedicated controller, or control may be distributed among more than one controller, as would be understood by one having ordinary skill in the art.

Similarly, in various additional exemplary embodiments of the present teachings, the controller 101 can be configured to dynamically estimate a pressure drop based ash load, $AL_{PD}$, in the particulate filter 111 based on the signals received from one or more of the sensors 112, 115, 116, 117 and 118 as set forth in the following exemplary embodiments and as would be understood by those having ordinary skill in the art depending on which sensors are available in a system for which ash load estimation is desired.

In various exemplary embodiments of the present teachings, the engine 102 can include additional sensors and/or instrumentation, indicated generally at 104, which provide information about engine performance (e.g., amount of oil consumed, mass airflow etc.) and engine running conditions (e.g., load, rotation speed etc.) to the controller 101. The additional sensors and/or instrumentation, indicated generally at 104, can also provide information regarding engine soot generation, and soot burned through active and passive regeneration (e.g., engine map, engine backpressure, transient factor, mass flow rate (Mexh), exhaust pressure, bed temperature, $O_2$ concentration, NO concentration, and $NO_2$ concentration). In various exemplary embodiments of the present teachings, the controller 101 can be configured to dynamically estimate a mass balance based soot load, $dSL_{MB}$, in the particulate filter 111 based on the signals received from one or more of the sensors 104 and one or more of the temperature sensors 115, 116 and 117 as set forth in the following exemplary embodiments and as would be understood by those having ordinary skill in the art depending on which sensors are available in a system for which soot load estimation is desired. Those having ordinary skill in the art would understand, for example, that in various exemplary embodiments of the present teachings, the $O_2$ and $NO_2$ concentration may also be estimated rather than or in addition to being sensed based on open-loop look up tables based on the engine 102 and the DOC 108 operating conditions.

In various additional exemplary embodiments of the present teachings, the controller 101 can be configured to dynamically estimate a mass balance based ash load, $dAL_{MB}$, in the particulate filter 111 based on the crankcase oil consumption rate or the signals received from one or more of the sensors 104 as set forth in the following exemplary embodiments and as would be understood by those having ordinary skill in the art depending on which sensors are available in a system for which ash load estimation is desired.

In accordance with various exemplary embodiments of the present teachings, the calculated soot load, $SL_c$, is a combination of two soot load estimates, $SL_{DP}$ and $dSL_{MB}$ (e.g., soot load estimates from pressure drop and mass balance based estimation), and the calculated ash load, $AL_c$, is a combination of the two ash load estimates, $AL_{DP}$ and $dAL_{MB}$, as defined by the following relations:

$$SL_c = \omega(SL_{i-1} + dSL_{MB}) + (1-\omega)SL_{DP} \qquad [1]$$

$$AL_c = \chi(AL_{i-1} + dAL_{MB}) + (1-\chi)AL_{DP} \qquad [2]$$

wherein $SL_{i-1}$ is the final soot load estimation from the last time step, $\omega$ is a gate parameter, $AL_{i-1}$ is the final ash load estimation from the last time step, and $\chi$ is a gate parameter. The gate parameters, $\omega$ and X, can be selected, for example, to be trust factors which may suppress either $SL_{DP}$ and $AL_{DP}$, or $dSL_{MB}$ and $dAL_{MB}$, during their respective periods of diminished accuracy, thereby determining the estimation approach employed by the system. On the other hand, the gate parameters, $\omega$ and X, may be selected so as to weight the contributions of $SL_{DP}$ and $dSL_{MB}$, or $AL_{DP}$ and $dAL_{MB}$, respectively, when calculating $SL_C$ and $AL_C$, respectively. Accordingly, the gate parameters can take any value from 0 to 1, depending on engine conditions and filter history. For example, when a gate parameter is set to equal 1, pressure drop based estimation is suppressed and $SL_c = SL_{i-1} + dSL_{MB}$. Conversely, when a gate parameter is set to equal 0, mass balance based estimation is suppressed and $SL_c = SL_{DP}$.

Those ordinarily skilled in the art would understand that the systems and methods of the present teachings contemplate a variety of different gate types and configurations. Depending on the application and calibration, exemplary gates may include, for example, exhaust temperature, exhaust flow rate, bed temperature, soot uniformity, pressure drop, oxidation rate, soot load rate, flow stability, pressure stability, filter history, regeneration conditions, etc. Additionally, to further employ gates, the present teachings contemplate using any known suitable gating methods and/or techniques as would be understood by those skilled in the art.

Various exemplary embodiments of the present teachings further contemplate filtering the estimates, $SL_c$ and $AL_c$, to determine a final estimated soot load, $SL_i$, and a final estimated ash load, $AL_i$, which can be determined, for example, by the following relations:

$$SL_i = \alpha SL_{i-1} + (1-\alpha)SL_c \qquad [3]$$

$$AL_i = \beta AL_{i-1} + (1-\beta)AL_c \qquad [4]$$

wherein $\alpha$ and $\beta$ are filter constants. Although the filter shown above may be a low-pass filter, those skilled in the art would understand that this filter is exemplary only and not intended to limit the present teachings or the claims. The present teachings contemplate using any known suitable filtering methods and/or techniques as would be understood by those ordinarily skilled in the art.

Although it is envisioned that a variety of pressure drop based approaches to soot load estimation known to those skilled in the art may be implemented during the periods when pressure drop approaches yield relatively highly accurate estimation (such as, for example, engine operating conditions other than long idling periods, regeneration periods, filter ash conditioning periods and/or other periods wherein gates would typically suppress unsteady data), one exemplary embodiment in accordance with the present teachings may utilize the pressure drop based approach disclosed in U.S. application Ser. No. 12/324,001, incorporated by reference herein. A summary of that pressure drop based soot load estimation technique is provided below.

For a particulate filter 111 of diameter D and length L, through which exhaust gas is flowing at a flow rate Q, a face velocity, $U_f$, can be defined as:

$$U_f = \frac{4Q}{\pi D^2}, \qquad [5]$$

and the filter's total pressure drop behavior can then be correlated to the face velocity using the following relation:

$$Eu = \frac{A_1}{Re} + \frac{A_2}{ReSCF_{soot}} + A_3. \qquad [6]$$

The Euler number, Eu, and the Reynolds number, Re, can be determined using the relations:

$$Eu = \frac{\Delta P}{(\rho U_f^2/2)} \qquad [7]$$

$$Re = \frac{\rho_{ref} U_f D}{\mu} \qquad [8]$$

wherein $\Delta P$ is the pressure drop, $\rho$ is the gas density, $\mu$ is the gas viscosity, and $SCF_{soot}$ is the Stokes-Cunningham factor correction to the soot layer permeability.

The present teachings contemplate using any known suitable methods to determine gas density and gas viscosity, such as, for example, by relying on the exhaust gas temperature T, which may be determined, for example, from measurements from sensors 116 and 117, such as by averaging or otherwise weighting those measurements and using the relations:

$$\rho = \frac{PM}{RT} \qquad [9]$$

$$\mu = 0.0000172 \left(\frac{T}{293.15}\right)^{0.74} \text{ (in kg/m.sec)} \qquad [10]$$

wherein P is pressure, T is temperature, M is the molecular weight, and R is the gas constant.

Furthermore, to account for non-continuum gas effects on soot layer permeability, exemplary embodiments of the present teachings contemplate using a known correction factor, such as, for example, a Stokes-Cunningham factor, which, for soot, is a function of soot layer pore Knudsen number, $K_{np}$, and can be defined as:

$$SCF = 1 + Knp(1.257 + 0.4\exp(-1.1/Knp)) \qquad [11]$$

wherein the soot layer pore Knudsen number, $K_{np}$, can be defined as:

$$Knp = \frac{L_{mfp}}{d_{soot}} \left[ \left(1 - \left(\frac{(1-S\_vf)}{0.6}\right)^{1.71}\right) + 1.5 * \left(\frac{(1-S\_vf)}{S\_vf}\right)\left(\frac{(1-S\_vf)}{0.6}\right)^{1.71} \right] \qquad [12]$$

and wherein $L_{mfp}$ is the gas mean-free-path, $d_{soot}$ is soot particle diameter, and $S\_vf$ is the solid fraction of the soot layer.

Although various exemplary embodiments of the present teachings assume availability of $L_{mfp}$, $d_{soot}$ and $S\_vf$, the above information can be obtained through any known suitable method, including methods that may require information from additional system sensors and/or instrumentation. For example, $L_{mfp}$ can be defined using the relation:

$$L_{mfp} = \frac{\mu}{\rho}\sqrt{\frac{\pi M}{2RT}} \quad [13]$$

while $d_{soot}$ and S_vf can be directly measured. By way of non-limiting example, $d_{soot}$ can be determined from scanning electron microscopy (SEM) analysis of diesel soot, and soot density can be estimated by dissecting a test particulate filter and accounting for soot mass and volume (e.g., measuring density as a function of flow conditions and correlating quantities). Those having ordinary skill in the art would understand various techniques for determining $d_{soot}$ and S_vf.

In various exemplary embodiments of the present teachings, filter parameters $A_1$, $A_2$ and $A_3$ can be directly calculated using the following equations:

$$A_1 = \frac{WD}{CPSIK_0 L_{eff} D_{hloaded}} +$$
$$\frac{4FD}{3CPSI}\left(\frac{L_{plug}}{D_{hloaded}^4} + \frac{L_{plug} + L_{ash}}{D_h^4}\right) + \frac{D}{2CPSIL_{eff}K_{ash}}\ln\left(\frac{D_h}{D_h - 2W_{ash}}\right) \quad [14]$$

$$A_2 = \frac{D}{2CPSIL_{eff}K_{soot}}\ln\left(\frac{D_h - 2W_{ash}}{D_h - 2W_{soot} - 2W_{ash}}\right) \quad [15]$$

$$A_3 = \frac{8}{3CPSI^2}\left[\frac{\zeta_{in}\rho}{D_{hloaded}^4 \rho_{in}} + \frac{2\zeta_{out}\rho}{D_h^4 \rho_{out}}\right] \quad [16]$$

wherein CPSI is the cells per unit area of the filter; W is the filter wall thickness; $K_0$ is the filter wall permeability; $K_{soot}$ is the soot layer permeability; $K_{ash}$ is the ash layer permeability; $L_{eff}$ is the effective length for filtering, which can be derived from filter geometry parameters (e.g., $L_{eff} = L_{filter} - 2L_{plug} - L_{ash}$, wherein $L_{filter}$ is the length of the filter, $L_{plug}$ is the length of the plug and $L_{ash}$ is the length of the ash plug); $D_h$ is clean filter hydraulic diameter; $D_{hloaded}$ is the soot/ash loaded hydraulic diameter; F is the fraction factor with a value of 28.454; $W_{ash}$ and $W_{soot}$ are the thickness of the ash and soot layers in the channel; and $\zeta_{in}$ and $\zeta_{out}$ are the coefficients of filter contraction and expansion losses.

Although various exemplary embodiments of the present teachings assume availability of the above filter configuration (e.g., geometry and microstructure) and particulate information required in the equations 14-16 above, that information can be obtained through any known suitable method, including methods that may require information from additional system sensors and/or instrumentation. Regardless of how the filter configuration and particulate information is obtained, however, exemplary embodiments of the present teachings utilize that information to solve for the parameters A1, A2, and A3 directly during the operation of the engine and particulate buildup without using an empirical approach. In this manner, the approach to estimating particulate (e.g., soot) load can be applied universally to differing filter geometries and microstructural properties operating under a wide range of conditions.

Various exemplary embodiments of the present teachings contemplate, for example, as discussed in more detail in Tandon, P. and D. E. Rosner, "Translational Brownian Diffusion Coefficient of Large (Multi-Particle) Suspended Aggregates," *I/EC Res.*, 34 (10), 3265-3277, 1995, directly calculating permeability, K, for a porous layer (which can be wall ($K_0$), soot ($K_{soot}$), or ash ($K_{ash}$)) using the relations:

$$K \approx \frac{3 - \frac{9}{2}(\varphi)^{\frac{1}{3}} - \frac{9}{2}(\varphi)^{\frac{5}{3}} - 3(\varphi)^2}{18\varphi\left(3 + 2\varphi^{\frac{5}{3}}\right)} D_c^2 \quad [17]$$

$$\varphi = (1 - \varepsilon) \quad [18]$$

wherein collector diameter, $D_c$, and porosity, $\varepsilon$, can be determined from mercury porosimetry measurement.

In accordance with various exemplary embodiments of the present teachings, the inventors have discovered that, for a given ash load, filter parameters $A_1$, $A_2$ and $A_3$ can be accurately fitted to a polynomial function (e.g., a first order or greater order polynomial) of soot load (SL), such as, for example, a second order polynomial function of SL as follows:

$$A_1 = a_1 SL^2 + b_1 SL + c_1$$

$$A_2 = a_2 SL^2 + b_2 SL + c_2$$

$$A_3 = f(SL, \text{Engine Conditions}) \quad [19]$$

Thus, with an instantaneous measurement of pressure drop and temperature by sensors 112, 115, 116, and 117, and flow rate, such as, for example, either by estimation as explained above or by measurement using sensor 118, a controller 101 can estimate a parameter A as:

$$A = EuReSCF_{soot} - A_3 \quad [20]$$

The instantaneous pressure drop based soot load, $SL_{pd}$, in the particulate filter 111 may be estimated using the following equation:

$$SL_{pd} = \frac{-(SCF_{soot}b_1 + b_2) + \sqrt{\begin{array}{c}SCF_{soot}^2 b_1^2 + b_2^2 + 2SCF_{soot}b_1 b_2 - \\ 4(SCF_{soot}a_1 + a_2)(SCF_{soot}c_1 + c_2 - A)\end{array}}}{2(SCF_{soot}a_1 + a_2)} \quad (21)$$

In accordance with exemplary embodiments of the present teachings, the same pressure based estimation scheme may also be used to estimate ash load in the particulate filter. For example, the inventors have additionally discovered that, for a given soot load, filter parameters $A_1$, $A_2$ and $A_3$ can be accurately fitted to a polynomial function (e.g., a first order or greater order polynomial) of ash load (AL), such as, for example, a second order polynomial function of AL as follows:

$$A_1 = m_1 AL^2 + n_1 AL + p_1$$

$$A_2 = m_2 AL^2 + n_2 AL + p_2$$

$$A_3 = f(AL, \text{Engine Conditions}) \quad [22]$$

Thus, the instantaneous pressure drop based ash load, $AL_{pd}$, in the particulate filter 111 may be estimated in the same manner as outlined above for pressure drop based soot load, $SL_{pd}$.

Although it is also envisioned that a variety of mass balanced based approaches to soot load estimation known to those skilled in the art may be implemented in accordance with the present teachings, one exemplary embodiment in accordance with the present teachings may utilize the mass balance based approach provided below.

An amount of soot mass change, in a particulate filter 111, can be defined, for example, as: the mass of soot added from the exhaust gas stream−(the mass of soot burnt during passive regeneration due to reaction with $NO_2$+the mass of soot burnt during active regeneration due to reaction with $O_2$). In other words, the instantaneous mass balanced based soot load (or change in soot mass), $dSL_{mb}$ ($\Delta SL$), in the particulate filter 111 may be estimated by determining the soot influx into the filter and subtracting the soot burnout by filter regeneration (catalyzed+non-catalyzed).

The mass of soot added from the gas stream (soot influx) can be estimated, for example, by the controller 101 or through calibration, which is usually a function of engine map, backpressure, and transient factor, as would be understood by those ordinarily skilled in the art.

The rate of total soot mass added from the exhaust gas stream to the filter can be estimated, for example, using the following theoretical model:

$$\frac{dSL_{MB}}{dt} = \left(\frac{dSL}{dt}\right)_{engine\ in} - \left(\frac{dSL}{dt}\right)_{N2} - \left(\frac{dSL}{dt}\right)_{O2} \quad [23]$$

The mass of soot burnt during passive regeneration can be estimated, for example, using the following theoretical model:

$$\left(\frac{dSL}{dt}\right)_{N2} = C_1 \dot{m}_{exh} y_{NO_2} \left[1 - \exp\left(-\frac{C_2 P_{exh} SL}{\dot{m}_{exh}} \exp\left(-\frac{C_3}{T}\right)\right)\right] \quad [24]$$

and the mass of soot burnt during active regeneration can be estimated, for example, using the following theoretical model:

$$\left(\frac{dSL}{dt}\right)_{O2} = C_4 \dot{m}_{exh} y_{O_2} \left[1 - \exp\left(-\frac{C_5 P_{exh} SL}{\dot{m}_{exh}} \exp\left(-\frac{C_6}{T}\right)\right)\right] \quad [25]$$

wherein $\frac{dSL}{dt}$ is change in rate of soot load, $C_1$, $C_2$, $C_3$, $C_4$, $C_5$ and $C_6$ are constants, $m_{exh}$ is exhaust mass flow rate, $y_{NO2}$ is $NO_2$ concentration, $Y_{O2}$ is $O_2$ concentration, $P_{exh}$ is exhaust pressure and T is bed temperature. While the models represented in equations [24] and [25] have been formulated considering the passive and active regeneration reactions to be of the order unity in $NO_2$ and $O_2$ concentrations respectively, those ordinarily skilled in the art would understand that the above theoretical models can readily be generalized for non-zero order reactions, as may be more appropriate, for example, for some catalyzed filters.

In accordance with additional exemplary embodiments of the present teachings, the instantaneous mass balance based ash load (or change in ash load), $dAL_{MB}$ ($\Delta AL$), can be estimated, for example, from the measured engine operating data and filter properties. The present teachings contemplate using any known suitable methods to estimate ash load. Various exemplary embodiments contemplate, for example, estimating ash load as a function of engine operating time or as a function of engine oil consumption. Although exemplary embodiments of the present teachings assume availability of such information, estimated ash load can be obtained through any known suitable method, including methods that may require information from additional engine sensors and/or instrumentation in order to estimate the ash load.

Figure 2:
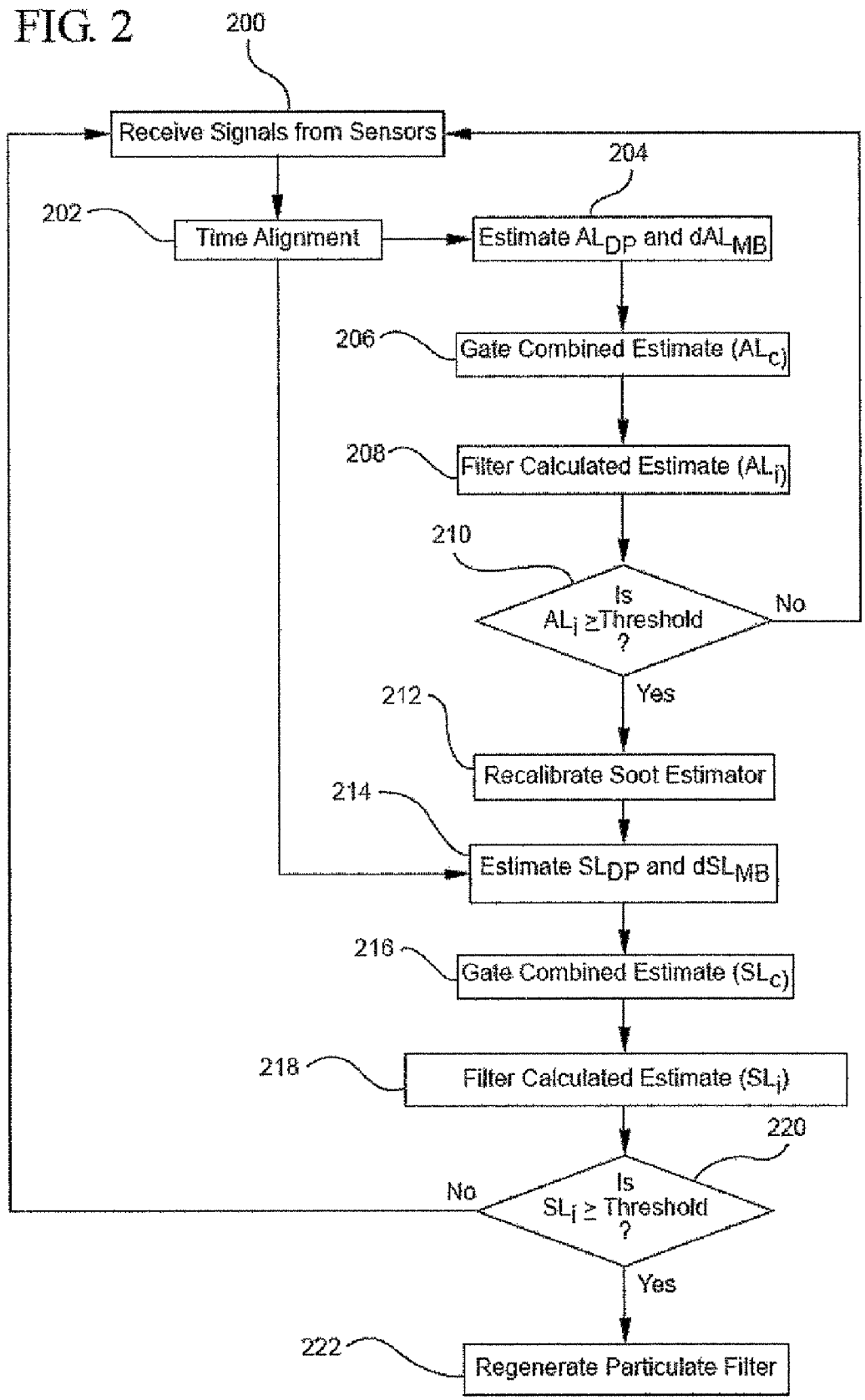
FIG. 2 is a flow diagram depicting an exemplary embodiment of a method for causing regeneration of a particulate filter in accordance with the present teachings.

FIG. 2 shows a logic flow diagram depicting an exemplary embodiment for causing regeneration of a particulate filter in accordance with the present teachings. In step 200 of FIG. 2, input signals are received from one or more sensors. The signals can correspond to the temperature, flow rate, and pressure drop of an exhaust gas flowing through the particulate filter, information about the configuration of the particulate filter (e.g., geometry and microstructure), as well as one or more engine operating conditions, such as, for example, the amount of oil consumed and/or engine run time, and one or more engine running conditions, such as, for example, load and/or rotation speed.

Various exemplary embodiments of the present teachings additionally consider directly estimating the flow rate of the exhaust from other measured values, such as, for example, engine speed and load or fuel flow and air flow. The exhaust flow rate can be estimated, for example, by adding the flow rate of the air admitted into the engine and the total quantity of fuel injected into the engine.

Various exemplary embodiments of the present teachings employ time alignment adjustments to the signals used to estimate soot load prior to performing calculations based on those signals. Thus, as shown in step 202 of FIG. 2, time alignment may be applied to the data received from the signals or otherwise from estimations as described above to improve accuracy of the soot load estimates. The present teachings contemplate using any known suitable time alignment methods and/or techniques as would be understood by those skilled in the art.

As shown in step 214 of FIG. 2, a pressure based soot load estimate, $SL_{DP}$, and a mass balance based soot load estimate, $dSL_{MB}$, in the particulate filter are continuously estimated from the measured or estimated data (e.g., temperature, flow rate, pressure drop, filter parameters, bed temperature, $O_2$ concentration, NO concentration, $NO_2$ concentration, etc.). In step 216, gate parameters are applied to the calculated hybrid soot load estimate, $SL_c$, as described above and shown and described in more detail below with reference to FIG. 3. Gating the predicted soot loads, $SL_{DP}$ and $dSL_{MB}$, at this time step, for example, helps to ensure that the soot load estimator is operating within a region in which the model produces relatively accurate estimates, and that the sensors are not malfunctioning or reacting to irregular operating conditions, such as, for example, extreme temperature and/or weather conditions, thereby generally providing more accurate soot load estimates.

After performing the soot load estimate, various exemplary embodiments of the present teachings employ filters to the calculated hybrid soot load estimate, $SL_c$, as shown in step 218 of FIG. 2. Filtering the soot load estimates at this time step, for example, helps to reduce wide fluctuations in estimates resulting from dynamic engine operating conditions, thereby also generally providing more accurate soot load estimates. The present teachings contemplate using any known suitable filtering methods and/or techniques as would be understood by those skilled in the art.

In step 220 of FIG. 2, the filtered estimated soot load, $SL_f$, can then be compared to a threshold soot load to determine whether or not the soot load level in the particulate filter is sufficient to warrant regeneration of the filter. If the estimated soot load is greater than or equal to the threshold value, the system causes regeneration of the filter, as indicated by the last step, 222, shown in the flow diagram of FIG. 2. The present teachings contemplate, for example, using any known suitable activation methods and/or techniques as would be understood by those skilled in the art. By way of example only, the present teachings contemplate using any known suitable regeneration methods and/or techniques, including, but not limited to, active and passive regeneration, and on-board and off-board (requiring operator intervention) regeneration. Exemplary regeneration techniques include, for example, heating inlet exhaust gases to a temperature at which it is favorable to burn soot off of a particulate filter and/or adding a catalyst to the filter to decrease the soot reaction light-off temperatures.

As also illustrated in the flow diagram shown in FIG. 2, various additional embodiments of the present teachings employ ash load estimation to determine when the parameters, $a_i$, $b_i$ and $c_i$ (e.g., Eq. 19) need re-calibration. As discussed above, a particulate filter's pressure drop behavior is a function of both soot load and ash load. Accordingly, soot load estimation can be performed, as described above and shown and described in more detail below with reference to FIG. 3, either in a mode where ash load ($AL_i$) is continuously updated (and parameters $a_i$, $b_i$, and $c_i$ are continuously updated) or in a mode where ash load is updated only at discrete intervals. As shown in steps 204, 206, and 208 of FIG. 2, in the mode where ash load is updated only at discrete intervals, when $AL_i$ is greater than or equal to a threshold value at step 210, a trigger can be sent to recalibrate the soot estimator at step 212, thereby updating $a_i$, $b_i$, and $c_i$. After the calibration, soot estimation can use the updated parameters $a_i$, $b_i$, and $c_i$ until it receives the next trigger to re-calibrate.

In a similar manner, various additional exemplary embodiments of the present teaching further employ soot load estimation to determine when the parameters, $m_i$, $n_i$ and $p_i$ (e.g., Eq. 22) need re-calibration.

Figure 3:
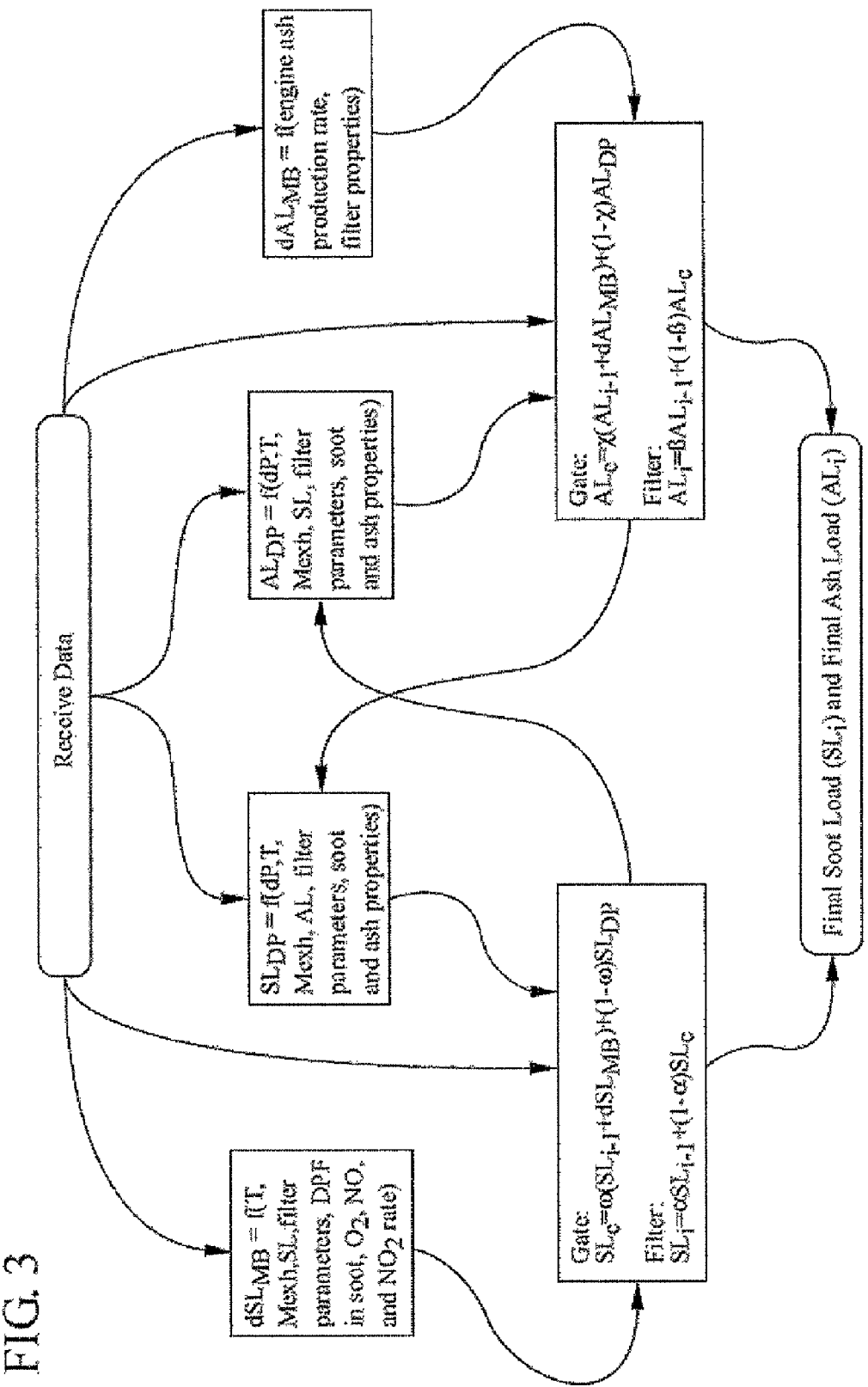
FIG. 3 is a flow diagram depicting an exemplary embodiment of a method for estimating soot load in a particulate filter in accordance with the present teachings.

Referring now to FIG. 3, a flow diagram depicting one exemplary embodiment for implementing the estimation of soot load in accordance with the present teachings is depicted. In FIG. 3, data is received corresponding to the flow rate, temperature and pressure drop of an exhaust gas flowing through the particulate filter, information about the configuration of the particulate filter (e.g., geometry and microstructure), as well as one or more engine operating conditions, such as, for example, the amount of oil consumed and/or engine run time, and one or more engine running conditions, such as, for example, load and/or rotation speed.

As explained above, in the next step of the flow diagram of FIG. 3, a pressure drop based soot load ($SL_{DP}$) and a pressure drop based ash load ($AL_{DP}$) can be estimated, for example, utilizing equation [21] and equation [22] respectively. Furthermore, a mass balance based soot load ($dSL_{MB}$) and a mass balance based ash load ($dAL_{MB}$) can be estimated, for example, utilizing the above explanation including equations [23] and [24].

In the next step depicted in the exemplary embodiment FIG. 3, to accurately estimate a current soot load ($SL_c$) and a current ash load ($AL_c$), gates may be employed, so as to suppress either $SL_{DP}$ and $AL_{DP}$, or $dSL_{MB}$ and $dAL_{MB}$, or to weight the contributions of $SL_{DP}$ and $dSL_{MB}$, or $AL_{DP}$ and $dAL_{MB}$, during their respective periods of diminished accuracy, utilizing equation [1] and equation [2] respectively.

As shown in the final step depicted in the flow diagram of FIG. 3, various exemplary embodiments of the present teachings also contemplate filtering the calculated soot load and ash load estimates ($SL_c$ and $AL_c$) to determine a final estimated soot load ($SL_i$) and a final estimated ash load ($AL_i$) for that time step.

The scheme depicted in the flow diagram of FIG. 3 is run every time step that it is called. Those skilled in the art would understand that the frequency with which the scheme is called depends upon the application applied.

In accordance with the above teachings, experimental tests were run to demonstrate soot load estimates corresponding to a pressure drop based estimation approach during filter ash conditioning using the methodology described herein and with reference to U.S. application Ser. No. 12/324,001, incorporated by reference herein (FIGS. 4A, 4B, 4C and 4D), a hybrid pressure drop and mass balance based estimation approach during filter ash conditioning (FIGS. 5A, 5B, 5C and 5D), and a hybrid pressure drop and mass balance based estimation approach during filter regeneration (FIGS. 6A, 6B, 6C and 6D).

Figure 4A:
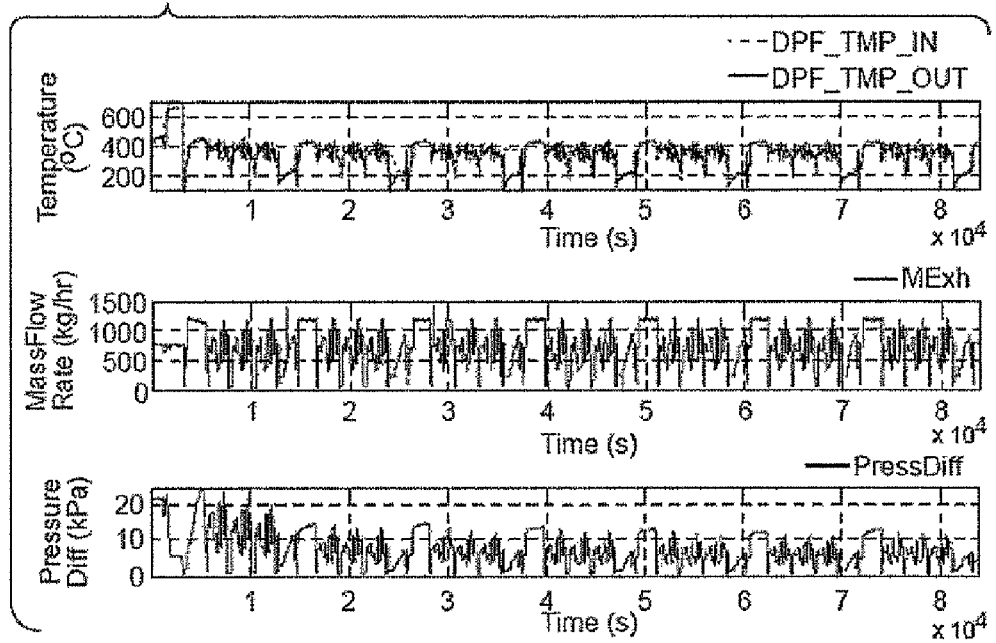
FIGS. 4A, 4B, 4C and 4D show results obtained from an experimental test of soot load as a function of time applying a pressure drop based estimation approach during filter ash conditioning.
Figure 4B:
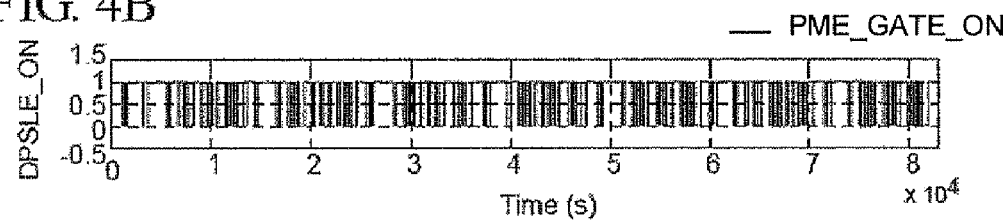
Figure 4C:
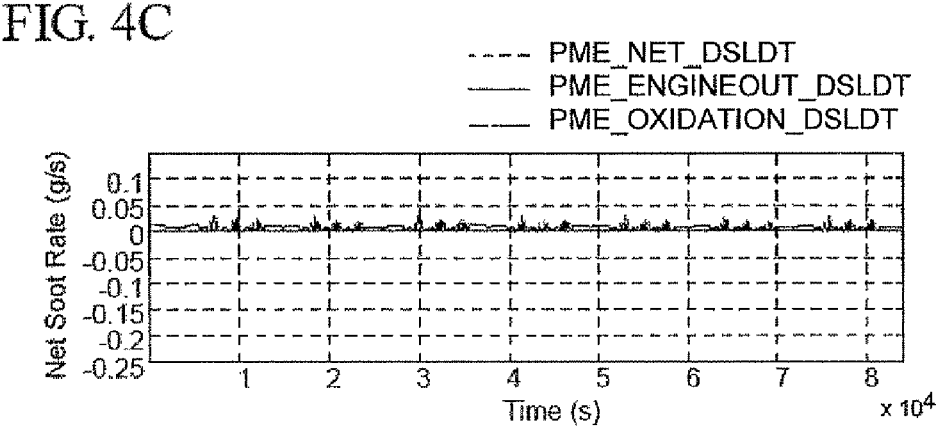
Figure 4D:
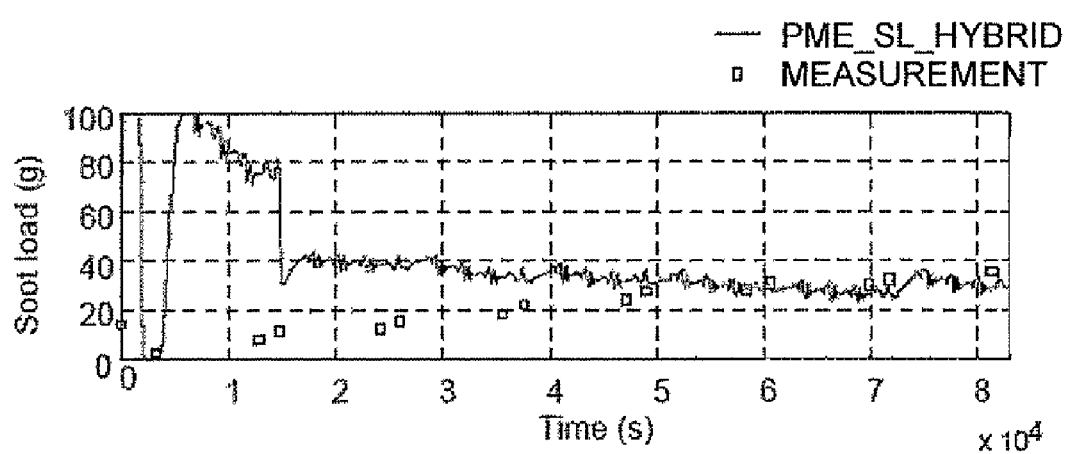
Figure 5A:
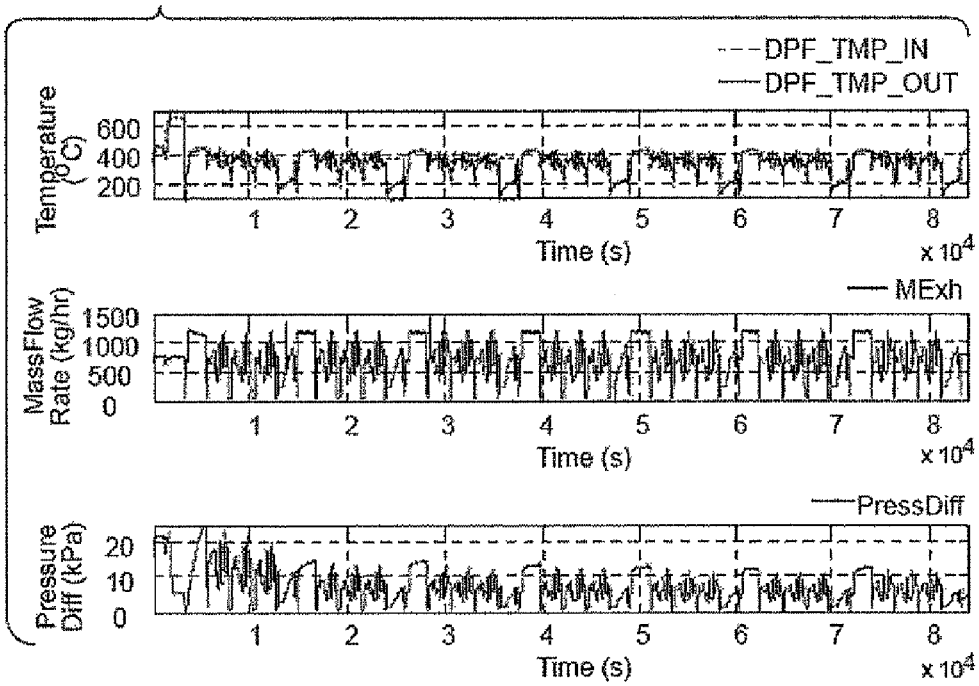
FIGS. 5A, 5B, 5C and 5D show results obtained from an experimental test of soot load as a function of time applying a hybrid pressure drop and mass balance based estimation approach during filter ash conditioning.

As illustrated in FIGS. 4A and 5A, engine operating conditions, including filter inlet and outlet temperature (C°), mass flow rate (kg/hr) and pressure differential (kPa) were tracked during a time interval of about $1\times10^4$ seconds and $8.4\times10^4$ seconds. In FIGS. 4A, 4B, 4C and 4D, a purely pressure drop based soot load estimation method, in accordance with exemplary embodiments of the present teachings, was tested using an initially green part (e.g., a fresh DPF starting out with little ash accumulation). In FIG. 4B, the PME_GATE_ON vs. Time plot demonstrates that the particle mass estimation (PME) gate worked during this period, and allowed pressure drop based estimation to occur whenever PME_GATE_ON was equal to 1, while in FIG. 4C, the Net Soot Rate vs. Time graph demonstrates that mass balance based estimation was off during this period.

The estimated soot load values are shown in comparison to actual soot load measurements (characterized by small squares on each plot) obtained by weighing the filter at discreet intervals. As shown by FIG. 4D, initially (e.g., when the filter is clean) the soot load estimates differed relatively significantly from the actual soot load measurements. However, as the filter became conditioned with ash, notably at about $5.4\times10^4$ seconds, the soot load estimates were substantially identical or very close to the actual soot load measurements.

Figure 5B:
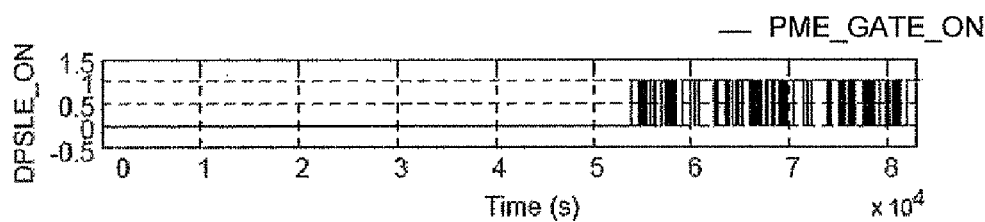
Figure 5C:
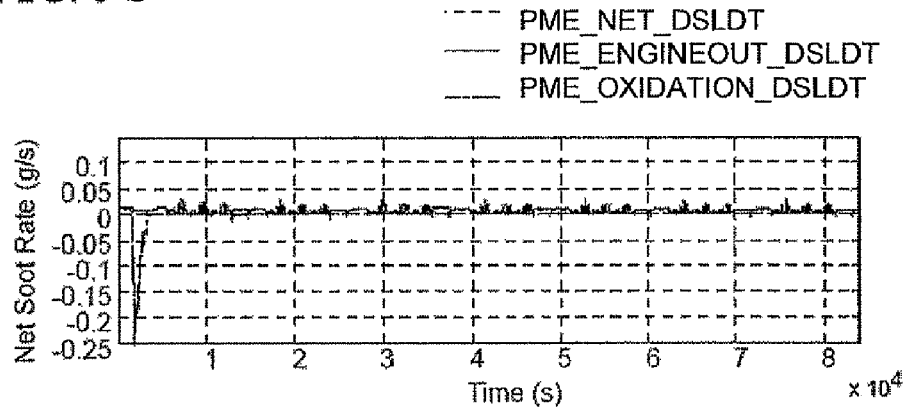

In FIGS. 5A, 5B, 5C and 5D, a hybrid pressure drop and mass balance based soot load estimation method, in accordance with exemplary embodiments of the present teachings, was tested once again using an initially green part. In FIG. 5B, the PME_GATE_ON vs. Time plot demonstrates that the particle mass estimation (PME) gate was working during this period and allowed pressure drop based estimation whenever PME_GATE_ON was equal to 1, and allowed mass balance based estimation whenever PME_GATE_ON was equal to 0. While, in FIG. 5C, the Net Soot Rate vs. Time graph demonstrates that mass balance based estimation also was on during this period, thereby tracking and accounting for the rate of soot added from the exhaust stream (PME_ENGINEOUT_DSLST), mass of soot burned due to reaction (PME_OXIDATION_DSLST), and the soot mass change inside the filter (PME_NET_DSLDT).

As before, the estimated soot load values are shown in comparison to actual soot load measurements (characterized by small squares on each plot) obtained by weighing the filter at discreet intervals. As shown by FIG. 5B, until about $5.4\times10^4$ seconds (e.g., during filter ash conditioning), PME_GATE_ON was equal to 0, demonstrating that the gate was suppressing pressure drop based estimation during this initial period and mass balanced based estimation was occurring. Consequently, as illustrated by FIG. 5D, the soot load estimates are substantially identical or very close to the actual soot load measurements throughout the entire period of engine operation, thereby demonstrating that the hybrid estimation approach of the present teachings solves the accuracy problem illustrated in FIG. 4D, increasing the overall accuracy of the of the soot load estimations.

Figure 6A:
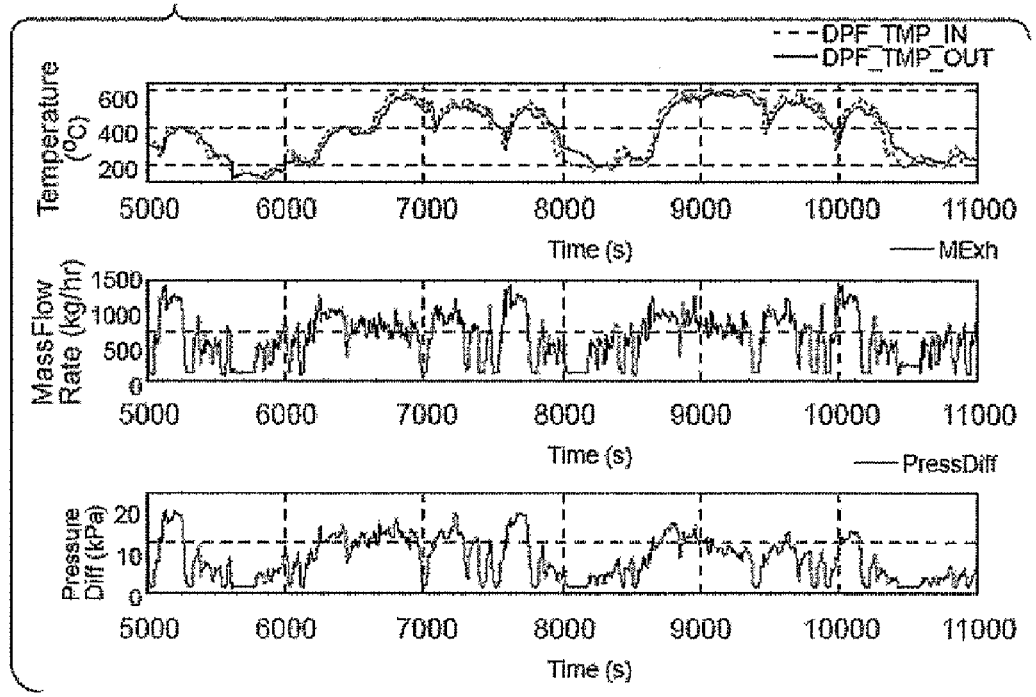
FIGS. 6A, 6B, 6C and 6D show results obtained from an experimental test of soot load as a function of time applying a hybrid pressure drop and mass balance based estimation approach during filter regeneration.
Figure 6B:
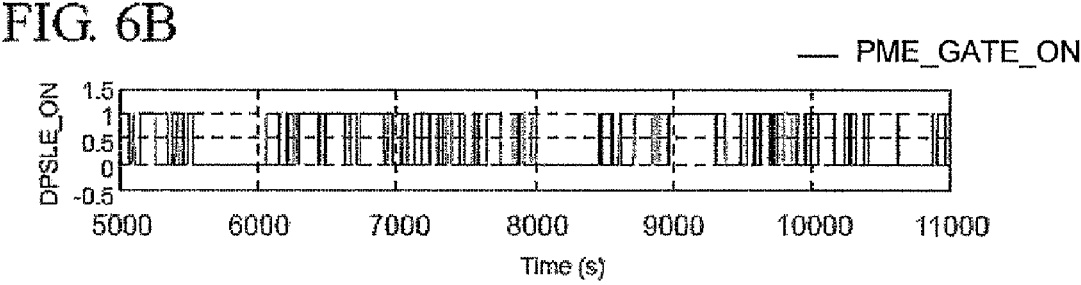
Figure 6C:
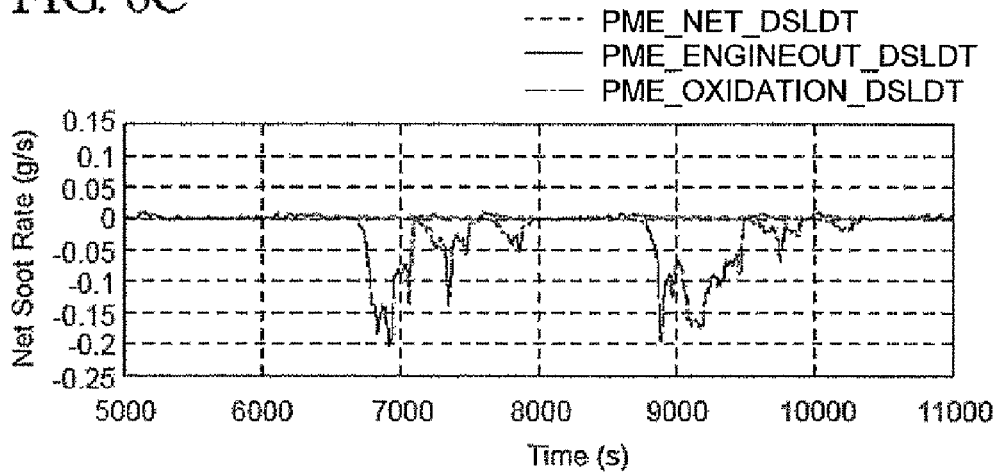

As illustrated in FIG. 6A, as before, engine operating conditions, including filter inlet and outlet temperature (C°), mass flow rate (kg/hr) and pressure differential (kPa) were tracked this time during a time interval of about 5000 seconds to about 11000 seconds. In FIGS. 6A, 6B, 6C and 6D, a hybrid pressure drop and mass balance based soot load estimation method, in accordance with exemplary embodiments of the present teachings, was tested during filter regeneration, as indicated by the temperature spikes in the Temperature vs. Time graph in FIG. 6A. In FIG. 6B, the PME_GATE_ON vs. Time plot demonstrates that the gate was working during this period and allowed pressure drop based estimation whenever PME_GATE_ON was equal to 1 and allowed mass balance based estimation whenever PME_GATE_ON was equal to 0. While, in FIG. 6C, the Net Soot Rate vs. Time graph demonstrates that mass balance based estimation was also on during this period, thereby tracking and accounting for the rate of soot added from the exhaust stream (PME_ENGINEOUT_DSLST), mass of soot burned due to reaction (PME_OXIDATION_DSLST), and the soot mass change inside the filter (PME_NET_DSLDT).

Figure 6D:
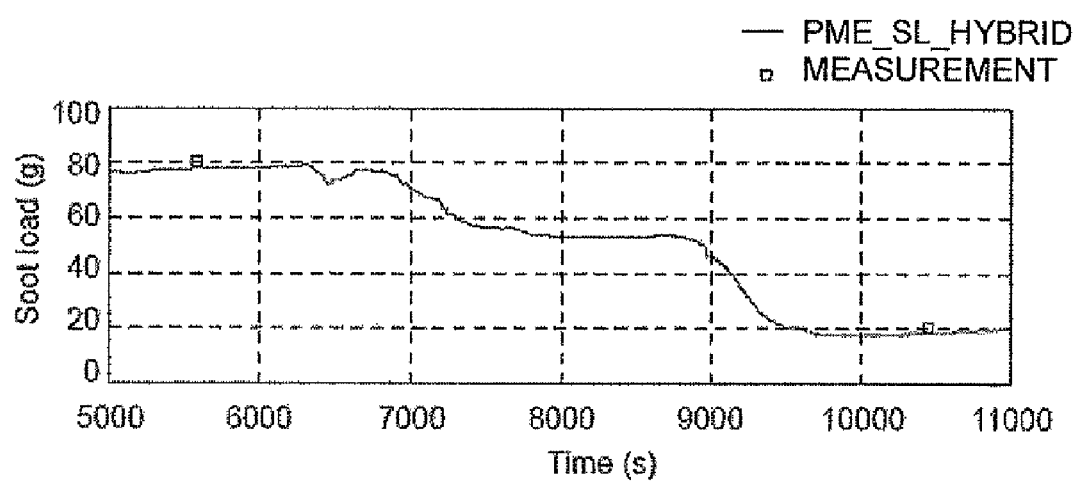

Once again, the estimated soot load values are shown in comparison to actual soot load measurements (characterized by small squares on each plot) obtained by weighing the filter at discreet intervals. As shown by FIG. 6D, the soot load estimates are substantially identical or very close to the actual soot load measurements throughout the entire period of engine operation, thereby demonstrating that the hybrid estimation approach of the present teachings also produces accurate soot load estimates during filter regeneration.

Figure 5D:
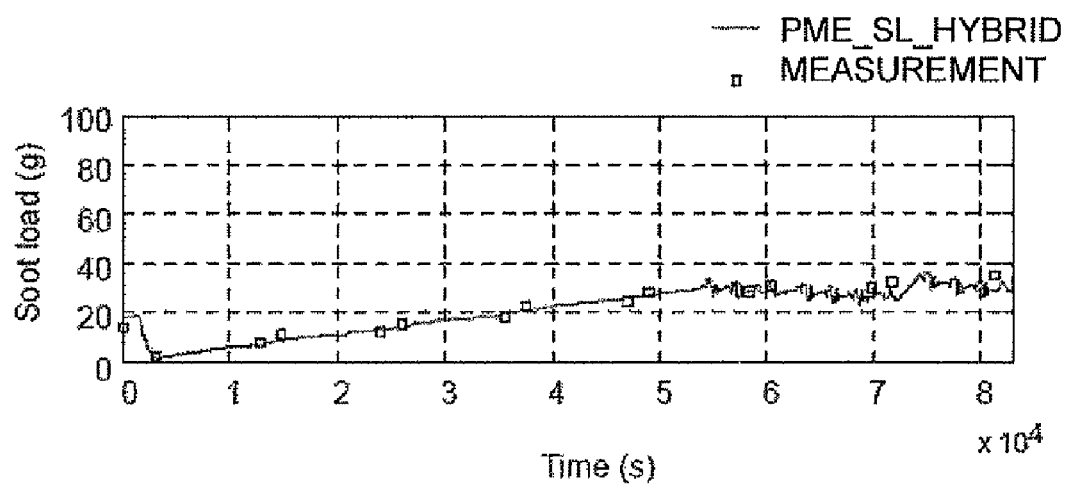

Thus, the results shown in FIGS. 4D, 5D, and 6D demonstrate that a hybrid soot load estimation approach, in accordance with various exemplary embodiments of the present teachings, can provide enhanced accuracy over either a pressure drop based approach or a mass balance based approach when used alone. Furthermore, limiting, FIG. 5D illustrates that the overall accuracy of a soot load estimation system can be increased by using pressure drop based estimation during periods of relatively high estimate accuracy (e.g., dynamic operating conditions, including acceleration, deceleration, and steady driving), but initiating mass balance based estimation during periods of diminished accuracy (e.g., during periods of filter ash conditioning). Accordingly, systems and methods for estimating soot load in a particulate filter in accordance with the present teachings, can be implemented to accurately estimate the soot load in a particulate filter throughout all periods of engine operation (e.g., during acceleration, deceleration, standard idling, extended idling, filter ash conditioning and active regeneration). Those having ordinary skill in the art would understand that the operating conditions described above and the engine cycle used for the studies are exemplary only and other operating conditions and/or engine cycles may be chosen depending on various factors without departing from the present teachings.

Although various exemplary embodiments shown and described herein relate to model based pressure drop based systems and methods for estimating soot load, as disclosed in U.S. application Ser. No. 12/324,001, incorporated by reference herein, those having ordinary skill in the art would understand that the teachings of that application provide an exemplary pressure drop soot load estimation approach and are not intended to limit the present teachings or the claims. Those having ordinary skill in the art would, therefore, understand that the systems and methods of the present teachings contemplate using any pressure drop based soot load estimation system and/or method (e.g., lookup table based or model based) in combination with any mass balance based soot load estimation system and/or method with which those ordinarily skilled in the art are familiar. In other words, the combination strategy disclosed in the exemplary embodiments of the present teachings is intended to be independent of the pressure based estimation approach and mass balance based estimation approach used.

Furthermore, although various exemplary embodiments shown and described herein relate to a system and method for estimating soot load of a particulate filter used in an automobile exhaust gas treatment system, those having ordinary skill in the art would understand that the methodology and systems described may have a broad range of application to particulate filters useful in a variety of applications, including, but not limited to, coal combustion processes, various other internal combustion engines, stationary and non-stationary, and other particulate filtration applications for which determining when regeneration should occur may be desirable. Ordinarily skill artisans would understand how to modify the exemplary systems and methods described herein to estimate particulate load of a particulate filter used in an application other than an automotive application.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It should be understood that while the invention has been described in detail with respect to certain exemplary embodiments thereof, it should not be considered limited to such, as numerous modifications are possible without departing from the broad scope of the appended claims.

We claim:

1. A method for regenerating a particulate filter, comprising:

calculating a first estimated soot load of a particulate filter based on a pressure drop of an exhaust gas flowing through the particulate filter;

calculating a second estimated soot load of the particulate filter based on a mass balance of soot in the particulate filter;

calculating a hybrid estimated soot load based on the first estimated soot load and the second estimated soot load, wherein calculating the hybrid estimated soot load comprises selectively applying at least one gate to the first estimated soot load and the second estimated soot load depending on periods of accuracy of calculating each of the first estimated soot load and the second estimated soot load, so as to weight a relative contribution of each of the first estimated soot load and the second estimated soot load to the hybrid estimated soot load; and causing regeneration of the particulate filter when the hybrid estimated soot load is greater than or equal to a threshold value.

2. The method of claim 1, wherein the at least one gate is selected from at least one of exhaust temperature, exhaust flow rate, bed temperature, soot uniformity, pressure drop, oxidation rate, soot load rate, flow stability, pressure stability, filter history, and regeneration conditions.

3. The method of claim 1, wherein calculating the first estimated soot load comprises determining a temperature, a flow rate, and a pressure drop of the exhaust gas flowing through the particulate filter.

4. The method of claim 3, wherein determining the pressure drop of the exhaust gas comprises determining a total pressure drop of the exhaust gas.

5. The method of claim 4, wherein determining the total pressure drop of the exhaust gas comprises determining inlet contraction losses, outlet expansion losses, inlet channel losses, outlet channel losses and permeable layer losses of the exhaust gas.

6. The method of claim 3, wherein calculating the first estimated soot load further comprises determining a corrected soot layer permeability.

7. The method of claim 6, wherein determining the corrected soot layer permeability comprises determining a Stokes-Cunningham correction factor to soot layer permeability.

8. The method of claim 1, wherein calculating the second estimated soot load comprises calculating an amount of soot mass change in the particulate filter based on soot influx and soot burnout by regeneration.

9. The method of claim 1, further comprising calculating an estimated ash load of the particulate filter.

10. The method of claim 9, wherein calculating an estimated ash load comprises:

calculating a first estimated ash load of the particulate filter based on a pressure drop in the particulate filter;

calculating a second estimated ash load of the particulate filter based on a mass balance of soot in the particulate filter; and calculating a hybrid estimated ash load based on the first estimated ash load and the second estimated ash load, wherein calculating the hybrid estimated ash load comprises applying at least one gate to weight a relative contribution of each of the first estimated ash load and the second estimated ash load to the hybrid estimated ash load.

11. The method of claim 1, further comprising applying one or more filters to filter dynamic fluctuations corresponding to the hybrid estimated soot load.

12. The method of claim 1, wherein the at least one gate is selected such that the relative contribution of each of the first estimated soot load and the second estimated soot load respectively ranges from 0 to 100 percent of the hybrid soot load.

13. A system for estimating soot load in a particulate filter, comprising:

a temperature sensor, a pressure drop sensor, and at least one engine sensor; and at least one controller configured to receive signals from the temperature sensor, the pressure drop sensor, and the at least one engine sensor, and dynamically calculate both a pressure drop based soot load estimate and a mass balance based soot load estimate based on the signals, wherein the controller is configured to selectively apply at least one gate to the pressure drop based soot load estimate and the mass balance based soot load estimate depending on periods of accuracy of calculating each of the pressure drop-based soot load estimate and the mass balance-based soot load estimate to weight a relative contribution of each of the pressure drop based soot load estimate and the mass balance based soot load estimate to determine a hybrid soot load estimate.

14. The system of claim 13, wherein the controller is configured to apply the at least one gate to suppress one of the pressure drop based soot load estimate and the mass balance based soot load estimate to determine the hybrid soot load estimate.

15. The system of claim 13, wherein the at least one gate is selected such that the relative contribution of each of the pressure drop based soot load estimate and the mass balance based soot load estimate ranges from 0 to 100 percent of the hybrid soot load estimate.

16. The system of claim 13, wherein the at least one controller is configured to estimate an ash load in the particulate filter.

17. The system of claim 13, wherein the at least one controller is configured to apply at least one filter to filter dynamic fluctuations corresponding to the hybrid soot load estimate.

18. The system of claim 17, wherein the at least one controller is configured to generate at least one response signal causing regeneration of the particulate filter when the hybrid soot load estimate is greater than or equal to a threshold value.

19. A method for regenerating a particulate filter used for treating exhaust gas from a combustion engine, the method comprising:

calculating a pressure drop based soot load estimate and a mass balance based soot load estimate;

weighting each of the pressure drop based soot load estimate and the mass balance based soot load estimate based on an accuracy of calculating the pressure drop-based soot load estimate and an accuracy of calculating the mass balance-based soot load estimate during periods of engine operation, the weighting yielding a weighted pressure drop based soot load estimate and a weighted mass balance based soot load estimate;

calculating a soot load estimate based on the weighted pressure drop based soot load estimate and the weighted mass balance based soot load estimate; and causing regeneration of the particulate filter when the hybrid estimated soot load is greater than or equal to a threshold value.

20. The method of claim 19, wherein the weighting comprises applying at least one gate to each of the pressure drop based soot load estimate and the mass balance based soot load estimate.

21. The method of claim 20, wherein the at least one gate is selected such that a relative contribution of each of the pressure drop based soot load estimate and the mass balance based soot load estimate to the calculated soot load estimate respectively ranges from 0 to 100 percent.

22. A method for regenerating a particulate filter, comprising:

calculating a first estimated soot load of a particulate filter based on a pressure drop of an exhaust gas flowing through the particulate filter;

calculating a second estimated soot load of the particulate filter based on a mass balance of soot in the particulate filter;

calculating a hybrid estimated soot load based on the first estimated soot load and the second estimated soot load, wherein calculating the hybrid estimated soot load comprises:

selectively applying a gate to the first estimated soot load and the second estimated soot load, depending on periods of accuracy of calculating each of the first estimated soot load and the second estimated soot load, so as to weight a relative contribution of each of the first estimated soot load and the second estimated soot load to the hybrid estimated soot load; and applying a filter to filter dynamic fluctuations corresponding to the hybrid estimated soot load;

wherein the gate is based on one or more of exhaust temperature, exhaust flow rate, bed temperature, soot uniformity, pressure drop, oxidation rate, soot load rate, flow stability, pressure stability, filter history, and regeneration conditions; and causing regeneration of the particulate filter when the hybrid estimated soot load is greater than or equal to a threshold value.

* * * * *